United States Patent [19]

Sandrock

[11] 4,152,145

[45] May 1, 1979

[54] MISCHMETAL-NICKEL-ALUMINUM ALLOYS

[76] Inventor: Gary D. Sandrock, 113 Kraft Pl., Ringwood, N.J. 07456

[21] Appl. No.: 886,555

[22] Filed: Mar. 14, 1978

[51] Int. Cl.$^2$ .............................................. C22C 19/03
[52] U.S. Cl. ............................................ 75/122; 34/15; 75/134 F; 75/170; 75/152; 148/32; 423/644
[58] Field of Search .................. 75/122, 134 F, 170, 75/152; 148/32; 423/644; 34/15

[56] References Cited

U.S. PATENT DOCUMENTS 3,825,418  7/1974  Reilly et al. ........................... 75/170

*Primary Examiner*—R. Dean

[57] ABSTRACT

A hydride forming alloy comprising of mischmetal, nickel and aluminum, having a composition responding approximately to the formula MM Ni$_{(y-[x+z])}$Al$_x$Fe$_z$ where x is a number from 0.1 to 1.5, y is a number between 4.5 and 5.5, z is a number between 0 and 0.3 and "x+z" has a maximum of 1.5.

6 Claims, No Drawings

MISCHMETAL-NICKEL-ALUMINUM ALLOYS

The present invention is concerned with alloys for the storage of hydrogen and, more particularly, with such alloys containing mischmetal.

BACKGROUND AND PROBLEM

A number of metals, alloys and intermetallic compounds are known which will store hydrogen in chemical combination and which will release the chemically combined hydrogen under appropriate conditions of temperature and pressure. It is advantageous to be able to store and release hydrogen over a range of moderate temperatures, for example, from 0° C. to not significantly greater than perhaps 95° C. and at pressures ranging from pressures greater than atmospheric (but not enormously greater) down to sub-atmospheric pressures. These conditions are advantageous because the hydrogen can then be recovered using water as a heat exchange medium and at pressures which are commonly employed in industry for various purposes.

It is important to realize, however, that the convenience of low temperature, moderate pressure delivery of hydrogen must be obtainable at a reasonable cost and without the need of critical hydrogen purification steps to avoid poisoning the storage medium. As of the present time, applicant is unaware of any hydride storage system which meets all of the aforestated requirements to the full satisfaction of the workers in the art. In particular, the alloy system apparently closest to the present invention in chemical composition, i.e., La-Ni-Al, is much more expensive and requires much higher temperatures during desorption of hydrogen to provide the advantageous desorption pressure range achieved by the alloys of the present invention. The alloy system apparently closest to the present invention with respect to conditions of absorption and desorption, i.e., $LaNi_5$ is much more expensive.

DISCOVERY AND OBJECTS

It has now been discovered that by means of a novel alloy containing mischmetal a hydride storage means can be provided which will deliver hydrogen at moderate pressures and temperatures and which will have a reasonable initial cost for hydridable metal.

It is an object of the present invention to provide a novel hydridable composition of matter.

Another object of the present invention is to provide a novel hydrogen storage system.

Other objects and advantages will become apparent from the following description.

GENERAL DESCRIPTION

Generally speaking, the present invention contemplates a hydride-forming alloy having a composition responding to the formula $$MM\ Ni_{(y-[x+z])}Al_xFe_z$$

wherein MM represents mischmetal having an equivalent atomic weight of about 140, "x" has a value of about 0.1 to 1.5, "z" has a value of 0 to 0.3, "x+z" has a maximum of 1.5, and "y" has a value of about 4.5 to 5.5. Alloys within the ambit of the present invention, when in the fully hydrided condition, have hydrogen dissociation pressures at 25° C. of about 0.01 to about 15 atmospheres absolute. Advantageously, "x" has a value in the range of 0.3 to 0.8 and "y" is substantially 5 and "z" is substantially 0. The foregoing formula shows that iron can be present in the alloy in an amount of up to 0.3 atom in substitution of part of the aluminum on an atom-for-atom basis provided that at least 0.1 atom of aluminum is present. This formula is presented only for the purpose of defining compostional limitations and is not intended to imply any quantitative equivalency in effect between aluminum and iron.

The alloys of the present invention are made by melting together commercially pure nickel, mischmetal and aluminum and iron, if desired. When melting the alloy, it is desirable to minimize contamination by elements such as oxygen, carbon and sulfur. Other than these elements, the alloys of the present invention can tolerate up to about 0.5% by weight of impurities normally associated with the three essential ingredients. After the alloy is completely melted and homogenized such as by heating to about 1425° C., it is then cast into any convenient shape. The casting is then broken up into particles of convenient mesh size. In use, the particles, for example, 1 cm average dimension, are put into a container and the residual air is evacuated. The particles are then exposed to hydrogen to form the hydride and, when required, the hydride is dissociated to recover the hydrogen. The charge-discharge cycle results in a breakdown of particle size of the alloy. Because of this particle breakdown, it is advantageous to employ the alloy of the present invention in containment means as described in copending U.S. applications in the names of Turillon and Sandrock.

Alloys of the present invention have been prepared with a mischmetal which contains about 48 to 50% cerium, about 32 to 34% lanthanum, about 13 to 14% neodymium, about 4 to about 5% praseodymium and about 1.5% other rare earths. Of course, as those skilled in the art will recognize, other grades of mischmetal can be employed in the alloys of the invention. Regardless of which grade of mischmetal is used, lanthanum will be a minor constituent of the commercial mixture and the mischmetal will cost a minor fraction of the cost of lanthanum.

It has been found that improved results relative to hydriding and dissociation of the hydride can be obtained by annealing the as-cast alloy of the present invention. Annealing can be carried out at temperatures greater than about 1050° C. and below the alloy melting point for about 1 to 24 hours. Annealing generally results in a flatter plateau in the pressure/composition charge-discharge curves.

EXAMPLES

In order to give those of normal skill in the art a greater appreciation and understanding of the invention, the following examples are given.

Quantities of mischmetal, nickel and aluminum were melted together in an induction furnace at a finish temperature of 1425° C. to provide cast alloys as set forth in Table 1.

TABLE 1

| Alloy | Mischmetal | | Nickel | | Aluminum | |
| No. | Atom | % by wt. | Atom | % by wt. | Atom | % by wt. |
|---|---|---|---|---|---|---|
| 1 | 1 | 33.5 | 4.5 | 63.25 | 0.5 | 3.2 |
| 2 | 1 | 34.0 | 4.3 | 61.4 | 0.7 | 4.6 |
| 3 | 1 | 34.6 | 4.1 | 59.4 | 0.9 | 6.0 |

The as-cast alloys set forth in Table 1, in particulate form, were hydrided by exposing them to hydrogen at a pressure of 68 atmospheres. Those skilled in the art will appreciate from the data set forth hereinafter that this pressure of hydrogen was used for testing purposes and that hydrogen charging can be carried out at lower pressures. The hydrogen was then desorbed from the alloys at 25° C. Atomic hydrogen to metal ratios and associated dissociation pressures obtained during desorptions are set forth in Table 2.

TABLE 2

| Alloy No. | H/Me* | Dissoc. Press Atm H$_2$(absol) |
|---|---|---|
| 1 | 0.2 | 2.3 |
| 2 | 0.2 | 0.44 |
| 3 | 0.2 | 0.075 |
| 1 | 0.4 | 3.2 |
| 2 | 0.4 | 0.71 |
| 3 | 0.4 | 0.15 |
| 1 | 0.6 | 4.3 |
| 2 | 0.6 | 1.33 |
| 3 | 0.6 | 0.60 |

*This ratio is unity when 6 atom weights of hydrogen are associated with 1 mole weight of alloy.

In comparison to the data set forth in Table 2, a mischmetal-nickel alloy containing no aluminum exhibited dissociation pressures in the range of about 25 to 30 atmospheres with hydrogen to metal ratios in the range of 0.2 to 0.6. Samples of alloy No. 1 were annealed at 1125° C. for 4 hours. By means of this treatment, the desorption plateau was flattened as indicated by the data set forth in Table 3 obtained with respect to Alloy No. 1 during hydrogen desorption conducted after annealing followed by hydrogenation.

TABLE 3

| H/Me | Dissoc. Press Atom H$_2$(absol) |
|---|---|
| 0.2 | 3.4 |
| 0.4 | 3.7 |
| 0.6 | 3.9 |

After annealing treatment, alloy No. 1 was also characterized by low hysterisis in the charge-discharge curves resulting from plotting hydrogen pressure versus metal to hydrogen ratio measured at 25° C.

The hydrogen discharge plateau pressure at various temperatures for alloy No. 1 in the annealed condition is indicated by the data set forth in Table 4.

TABLE 4

| Temp. °C. | Hydrogen Dissociation Pressure Atm (Abs) | |
|---|---|---|
| | H/Me = 0.2 | H/Me = 0.6 |
| 0 | 1.2 | 1.4 |
| 25 | 3.4 | 3.9 |
| 60 | 11.0 | 12.5 |
| 99 | 34.0 | 38.0 |

The data in Table 4 shows that the alloys of the present invention can exhibit wide ranges of hydrogen discharge pressures over a temperature range readily obtainable with water-based heat exchange media. In contrast, superficially similar alloys containing lanthanum in place of mischmetal must be heated to much higher temperatures during hydrogen discharge in order to approach the range of useful pressures evidenced by the data in Table 4.

As shown in Table 4, alloy No. 1 is particularly useful in that even at 0° C. the plateau pressure for hydrogen dissociation is above atmospheric thereby easing the design of vehicular hydrogen fuel systems.

While the present invention has been described in conjunction with specific embodiments, those of normal skill in the art will appreciate that modifications and variations can be made without departing from the ambit of the present invention. Such modifications and variations are envisioned to be within the scope of the claims.

I claim:
1. A mischmetal-nickel-aluminum alloy responding substantially to the formula

MM Ni$_{(y-[x+z])}$Al$_x$Fe$_z$ where MM signifies mischmetal, y is a number between 4.5 and 5.5, x is a number between 0.1 and 1.5, z is a number between 0 and 0.3 and "x+z" has a maximum of 1.5.

2. An alloy as in claim 1 wherein y equals about 5, x equals about 0.5 and z is substantially 0.

3. An alloy as in claim 1 in the annealed condition.

4. An alloy as in claim 2 in the annealed condition.

5. An alloy as in claim 1 wherein y is about 5, x is a number between 0.3 and 0.8 and z is substantially 0.

6. A hydrogen storage system containing as a hydride storage medium a mischmetal-nickel-aluminum alloy responding substantially to the formula MM Ni$_{(y-[x+z])}$Al$_x$Fe$_z$ where MM signifies mischmetal, y is a number between 4.5 and 5.5, x is a number between 0.1 and 1.5, z is a number between 0 and 0.3 and "x+z" is a maximum of 1.5.

* * * * *